United States Patent [19]

Murayama et al.

[11] 4,314,032
[45] Feb. 2, 1982

[54] CROSSLINKED POLYVINYL ALCOHOL GEL

[75] Inventors: Naohiro Murayama; Teruo Sakagami, both of Iwaki, Japan

[73] Assignee: Kureha Kagaku Kogyo Kabushiki Kaisha, Tokyo, Japan

[21] Appl. No.: 85,682

[22] Filed: Oct. 17, 1979

[30] Foreign Application Priority Data

Oct. 26, 1978 [JP] Japan ................. 53/131785
Feb. 2, 1979 [JP] Japan ................. 54/011246

[51] Int. Cl.$^3$ .................................. C08F 8/12
[52] U.S. Cl. ......................... 521/52; 210/656; 260/29.6 B; 260/29.6 BE; 525/58; 525/59; 525/60
[58] Field of Search ............. 525/58, 60, 59; 521/52; 260/29.6 BE, 29.6 B

[56] References Cited

U.S. PATENT DOCUMENTS

2,843,562  7/1958  Caldwell .................. 525/59

FOREIGN PATENT DOCUMENTS

2333005  11/1976  France .
495763  10/1976  Switzerland .
1135302  12/1968  United Kingdom .
1230560   5/1971  United Kingdom .
1479114   7/1977  United Kingdom .

OTHER PUBLICATIONS

CA, 88, (12) 74888j, (Mar. 20, 1978).

Primary Examiner—Stanford M. Levin
Attorney, Agent, or Firm—Oblon, Fisher, Spivak, McClelland & Maier

[57] ABSTRACT

A crosslinked polyvinyl alcohol gel having vinyl alcohol units and crosslinking units having the formula

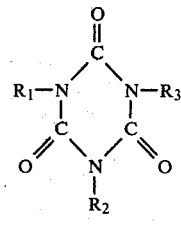 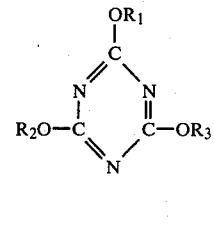

(I)          (II)

wherein $R_1$, $R_2$ and $R_3$ are respectively the same or different and selected from the group consisting of $-CH_2-CH=CH_2$, $-CH_2-CH\equiv CH$ and

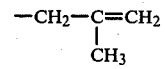

as a packing for a gel chromatography.

9 Claims, 3 Drawing Figures

CROSSLINKED POLYVINYL ALCOHOL GEL

BACKGROUND OF THE INVENTION

1. Field of the Invention

The present invention relates to a crosslinked polyvinyl alcohol gel which is used for a gel chromatography.

More particularly, it relates to a crosslinked polyvinyl alcohol gel obtained by copolymerizing vinyl acylate and a crosslinking agent having triazine ring and hydrolyzing the product.

2. Description of the Prior Art

The gel chromatography is the newest chromatography using a porous gel as a packing to separate compounds depending upon sizes of the molecules as well-known.

The gel chromatography can be applied for an aqueous solution or an organic solvent solution in various fields and can be applied for most of the compounds having different molecular weight. Thus, the gel chromatography can be a filtering technology which can be industrially applied in various fields.

As packing gels used in a gel chromatography in an aqueous solution, dextran gel and polyacrylamide gel are mainly used and also other gels such as starch gel, agar gel and agarose gel have been used.

However, these conventional packing gels used in the aqueous solution, soften as a function of increasing pore size as a results of water content, whereby the packed gel easily pulverizes when subjected to such mechanical operations as stirring when packed in a column etc. and it has sufficient strength to be durable in pressurizing operations, disadvantageously. That is, the pulverizing of the packed gel causes nonuniform packing in the column to deteriorate the separating characteristics.

Thus, the conventional gels for aqueous gel chromatography is difficult to be uniformly packed in a large column. This is one of the reasons for preventing an industrial application of the aqueous gel chromatography.

Such disadvantages of the conventional aqueous gels have been caused because the gels have only small pore size in a dry condition and have large pore size by swelling in an aqueous solution and the difference of the pore sizes in the dry condition and in the wet condition is too large.

In order to overcome these disadvantages, it is necessary to increase a strength in the crosslinked form and to have the same pore size in the dry condition as the pore size in an aqueous solution.

The present invention has been attained by studying crosslinking agents for gels used in aqueous solutions. It is to improve the strength of the gels used in aqueous solutions and to use the gel as a packing for a gel chromatography. The gel is used for effectively desalting from an aqueous solution of a macromolecular compound.

The product of the present invention used for desalting from an aqueous solution of a macromolecular compound is produced by using polyvinyl alcohol gel crosslinked by a crosslinking agent having triazine ring such as triallyl isocyanurate.

It has been well-known that a polyvinyl alcohol gel has molecular weight fractioning characteristics as a gel packed in an aqueous gel chromatography. For example, it has been proposed to use the polyvinyl alcohol gel obtained by hydrolyzing polyvinyl acetate crosslinked with butanedioldivinyl ether by W. Heitz in Macromolekularen Chemie 98 42 (1966). It has been also proposed to produce a polyvinyl alcohol gel by hydrolyzing a copolymer of vinyl acetate and diethyleneglycol dimethacrylate with a base and then, post-crosslinking the product with epichlorohydrin in Japanese Unexamined Patent Publication No. 138077/1977.

However, as is well-known, these crosslinking agents such as diethyleneglycol dimethacrylate and butanediol divinyl ether cause hydrolysis of the crosslinking agents at the hydrolysis of the polyvinyl acetate. Thus, it is difficult to maintain the desired initial crosslinkage.

It has been proposed to carry out the post-crosslinking treatment with epichlorohydrin after the hydrolysis of polyvinyl acetate from said view-point in Japanese Unexamined Patent Publication No. 138077/1977.

SUMMARY OF THE INVENTION

It is an object of the present invention to provide a crosslinked polyvinyl alcohol bead gel having no variation of the structure before and after the hydrolysis.

It is another object of the present invention to provide a crosslinked polyvinyl alcohol bead gel which has high mechanical strength in both of the dry condition and the wet condition.

It is the other object of the present invention to provide crosslinked polyvinyl alcohol bead gel which has substantially uniform structure and which is stable in a strong acid or a strong base.

It is the other object of the present invention to form a structure of a gel by a copolymerization before a hydrolysis.

The foregoing and other objects of the present invention have been attained by providing a crosslinked polyvinyl alcohol gel which is obtained by copolymerizing 100 wt. parts of a vinyl acylate and 0.1 to 50 wt. parts of a crosslinking agent having the formula (1) or (II) and hydrolyzing the product

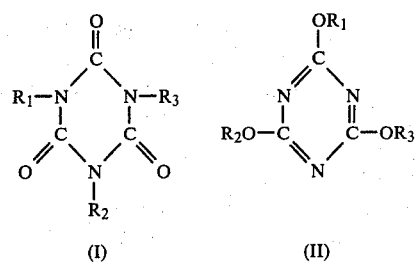

wherein $R_1$, $R_2$ and $R_3$ are respectively the same or different and selected from the group consisting of $-CH_2-CH=CH_2$, $-CH_2-C\equiv CH$ and

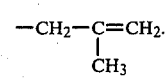

The crosslinked polyvinyl alcohol gel can be further crosslinked by epichlorohydrin.

The crosslinked polyvinyl alcohol has a unit ratio of the crosslinking agent component to the vinyl alcohol component based on the charged ratio since the crosslinked components are not separated by the hydrolysis.

DETAILED DESCRIPTION OF THE PREFERRED EMBODIMENTS

Figure 1:
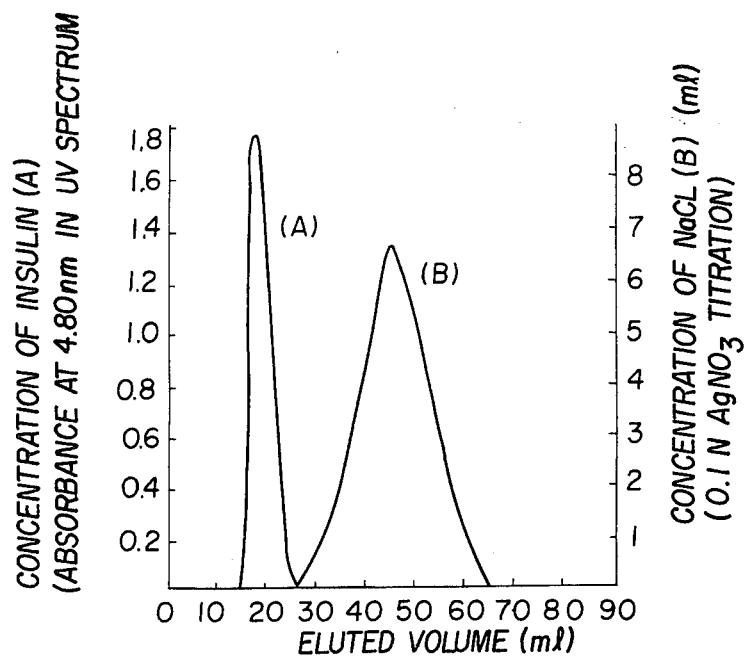
FIG. 1 is a graph of a separation pattern for separating inulin and sodium chloride by a gel chromatography using the gel obtained by the process of Example 1.

The crosslinked polyvinyl alcohol bead gel of the present invention has the three dimentional net structure by the crosslinkages of the crosslinking agent (I) or (II) and the vinyl alcohol units are bonded by these crosslinkages. The charged ratio of the vinyl acylate and the crosslinking agent (I) or (II) is substantially the same with the unit ratios except the vinyl acylate should be considered to be modified to vinyl alcohol unit.

The effective pore sizes of the crosslinked polyvinyl alcohol bead gel is in a range of 100 to 5,000 Å preferably 200 to 2,000 Å.

The copolymers of vinyl acylate and a crosslinking agent having the formula (I) or (II) used in the present invention are remarkably stable in a strong acid or a strong base. The ring cleavage of the crosslinking agent (I), (II) may not be caused in the hydrolysis of polyvinyl acylate with a base so as to maintain the crosslinked structure of the copolymer. Therefore, it is not always necessary to carry out the post-crosslinking after the hydrolysis, and the satisfactory crosslinkage can be given only by the crosslinking in the copolymerization of vinyl acylate the crosslinking agent. The resulting polyvinyl alcohol gel is not easily pulverized and can be easily manually treated and is optimum as a packing for aqueous gel chromatography and can be used for desalting from an aqueous solution of a macromolecular compound in high efficiency.

The gels of the present invention are nonionic gels as one of the characteristics of the present invention.

The vinyl acylate is a compound having the formula

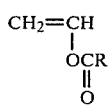

wherein R represents a lower alkyl group such as methyl, ethyl, n-butyl or 2-ethyl hexyl group. The typical vinyl acylate is vinyl acetate and accordingly, the use of vinyl acetate will be mainly discussed.

The crosslinking agents used in the present invention are the crosslinking agents having the formula (I) or (II).

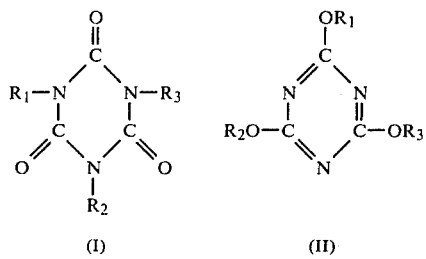

wherein $R_1$, $R_2$ and $R_3$ are the same or different and are respectively selected from the group consisting of $-CH_2-CH=CH_2$, $-CH_2-C\equiv CH$ and

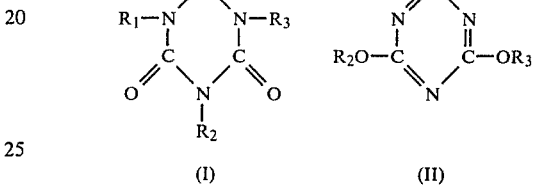

The compound having the formula (I) wherein $R_1$, $R_2$ and $R_3$ are respectively $-CH_2-CH=CH_2$ is easily available and has excellent heat resistance and acid and alkali resistance to be the useful crosslinking agent among the crosslinking agents in the definition.

These crosslinking agents are easily polymerized by a radical polymerization catalyst, an ion polymerization catalyst or anionizing radiation, and are highly copolymerizable with vinyl acylate.

The crosslinking agent (I) or (II) can be used not only by itself but also as a mixture of the compounds having different substituents.

The crosslinking agent (I) or (II) is polymerizable by itself. Thus, it is also possible that a prepolymer of a mixture of the crosslinking agents having different substituents is previously produced and then vinyl acylate is copolymerized to form the crosslinkage.

The polymerization of vinyl acylate and the crosslinking agent (I) or (II) can be the conventional polymerization, such as a solution polymerization, a suspension polymerization, an emulsion polymerization and a bulk polymerization.

The gel used for the gel chromatography in the present invention are preferably in a form of bead. Thus, it is preferable to be a suspension polymerization in which an organic solvent can be added in the copolymerization as a diluent for controlling a water content (pore size) of the resulting crosslinked polyvinyl alcohol.

The suspending agent in the suspension polymerization can be a hydrophilic macromolecular compound such as polyvinyl alcohol, polyethyleneoxide, polyvinyl pyrolidone, ethyleneoxide-propyleneoxide copolymer and methyl cellulose in an aqueous solution and a macromolecular compound such as polyvinyl acetate in an organic solvent solution.

The particle size of the gel is not critical and can be in a range of about 10μ to 500μ.

The catalyst in the copolymerization is not critical and can be the conventional radical catalyst such as benzoyl peroxide, lauroyl peroxide and azobisiobutyronitrile.

The amount of the crosslinking agent is depending upon a water content (pore size) of the gel used for the gel chromatography.

A gel having higher hardness (crosslinkage) can be obtained by increasing a ratio of the crosslinking agent to vinyl acylate. The water content of the polyvinyl alcohol gel obtained after the hydrolysis can be varied depending upon the ratio of the crosslinking agent.

In order to obtain a desired pore size of the gel, a ratio of the crosslinking agent is varied and also, a diluent for controlling a water content can be added at a desired ratio, if necessary.

The polyvinyl alcohol gel having higher hardness(-crosslinkage) and larger filtering rate can be easily obtained by adding the diluent.

The crosslinking agent is usually used at a ratio of 0.1 to 50 wt. parts preferably 0.5 to 30 wt. parts to 100 wt. parts of vinyl acylate.

The diluent for controlling a water content should be inert to vinyl acetate, the crosslinking agent and the catalyst, but has a property for dissolving or swelling polyvinyl acylate such as polyvinyl acetate.

Suitable solvents include methanol, nitromethane, ethanol, acetonitrile, methacresol, pyridine, benzyl alcohol, aniline, acetone, nitrobenzene, cyclohexanone, carbon dichloride, methyl acetate, bromobenzene, chlorobenzene, trichloroethylene, chloroform, methyl ethyl ketone, furfural, benzene, toluene, ethyl acetate, butyl acetate, dimethylsulfoxide, carbon tetrachloride, acetic amide, and a mixture thereof (solvents for dissolving polyvinyl acylates); isopropanol, n-propanol, butanol, xylene, ethyl ether, n-heptyl alcohol, dichlorobenzene, pinacolin, amyl alcohol and a mixture thereof (solvents for swelling polyvinyl acylates); ethyleneglycohol, hexanol, n-butyl ether, carbon disulfide, glycerine, cyclohexane, solvent naphtha, n-hexane, n-heptane, n-octane, turpentine oil and a mixture thereof(non-solvent).

The pore size of the bead gel can be controlled by selecting the amount and the kind and the ratio of the diluent (solvent or non-solvent type).

The total amount of the diluent is depending upon the pore size and is usually in a range of 0 to 1,000 wt. parts per 100 wt. parts of the vinyl acylate monomer.

The polymerization initiator can be radical initiators which include acylperoxides such as laurylperoxide, benzoylperoxide and acetylperoxide; alkylperoxides such as di-tert-butylperoxide and dicumylperoxide; peroxy esters such as tert-butylperoxybenzoate, tert-butylperoxyacetate, tert-butylperoxyoctoate; and azo compounds such as azobisisobutyronitrile and azobisisovaleronitrile.

The resulting copolymer of vinyl acylate and the crosslinking agent (I) or (II) is hydrolyzed. The process for hydrolysis is not critical and it is usually hydrolyzed in an aqueous solution of a base or an alcohol-base-water mixture.

The hydrolysis can be performed at room temperature but preferably at 50° to 60° C. or under refluxing the alcohol-water mixture.

IR band of carbonyl group of polyvinyl acetate is at about 1730 cm$^{-1}$. After the hydrolysis, the IR band completely disappear.

The gel of the hydrolyzed product obtained by hydrolyzing the copolymer of vinyl acylate and the crosslinking agent (I) or (II) has remarkable crosslinkages. The water content of the gel can be controlled as desired. Thus, the crosslinked polyvinyl alcohol gel obtained by the hydrolysis can be further post-treated by a crosslinking reaction such as formalization or a crosslinking treatment with epichlorohydrin.

When the crosslinked polyvinyl alcohol gel is further crosslinked by epichlorohydrin after the hydrolysis, the shrinkage of the gel in an aqueous solution of an electrolyte is further decreased to be superior as a gel for gel permeation.

The crosslinked polyvinyl alcohol gels obtained by the above described method have high strength and molecular weight fractioning characteristic required as the gel for aqueous gel chromatography and it is effectively used for desalting from an aqueous solution of a macromolecular compound.

The crosslinked polyvinyl alcohol gel of the present invention can be used for various fractionings of proteins and macromolecular compounds.

As one of the separation, a desalting from a macromolecular compound will be illustrated.

The concentration of a salt in an aqueous solution of a macromolecular compound used for the desalting can be high, for example, saturated sodium chloride solution as 26% NaCl solution. The concentration of a salt in the aqueous solution can be selected from a wide range. When the crosslinkage of the crosslinked polyvinyl alcohol is low, shrinkage of the gel increases depending upon the increase in concentration of salt. Thus, the crosslinked polyvinyl alcohol gel is preferably shrunk in a solution having a high concentration of salt when packing the gel into a column and the gel is set in a shrunken condition for the gel volume of the column.

When the crosslinking agent is used at high ratio such as more than 20 wt. parts to 100 wt. parts of vinyl acylate, the shrinkage is relatively small.

The salts for desalting can be not only monovalent-monovalent salts such as sodium chloride and ammonium chloride but also monovalent-divalent salts such as sodium sulfate, sodium hydrogen sulfate and calcium chloride; divalent-divalent salts such as magnesium sulfate; inorganic salts of monovalent or polyvalent ions and organic acid-metal salts such as sodium acetate, potassium formate and sodium oxalate. These salts can be effectively separated from a macromolecular compound.

The column in which the crosslinked polyvinyl alcohol gel is packed is not critical and can be the conventional columns for gel chromatography and usually a cylinder made of glass, stainless steel or a desired plastic.

When the effect of an inner wall of a column is high, a separated layer is disturbed even though the gel is uniformly packed. It is effective to form a coated layer of silane etc. on the inner wall by using dichlorodimethyl silane etc.

On the other hand, the water soluble macromolecular compounds fractioned are not critical and can be various ones such as polysaccharides, proteins, glycoproteins, cardiotonic glycosides, enzymes as well as water soluble vitamins, antibiotics, hormones, sterols, etc.

The crosslinked polyvinyl alcohol gel crosslinked by the crosslinking agent having the formula (I) or (II) can be packed into the column by pumping after defoamation by a stirrer since the gel has high mechanical strength and stability.

As an eluent, water is usually used, but the other buffering solutions can be also used. An aqueous solution containing a small amount of an organic solvent can be also used.

The desalting from the macromolecular compound by gel permeation using the crosslinked polyvinyl alcohol crosslinked by the crosslinking agent having the formula (I) or (II) is remarkably useful for the industrial desalting from an aqueous solution of the macromolecular compound.

The present invention will be further illustrated by certain examples.

EXAMPLE 1

A suspension polymerization was carried out by using a system containing 90 g. of vinyl acetate, 0.2 g. of polyethyleneoxide (Alcox E 160 manufactured by Meisei Kagaku Kogyo K.K.) 4.5 g. of triallyl isocyanurate, 0.9 g. of benzoylperoxide and 210 g. of water at 60° C. for 16 hours to obtain crosslinked polyvinyl acetate beads. The product was filtered and washed with water and the crosslinked polyvinyl acetate was hydrolyzed in a mixture of 50 g. of sodium hydroxide, 100 g. of methanol and 100 g. of water at 60° C. According to Infrared spectrum, the crosslinked polyvinyl acetate before the hydrolysis had IR band at 1730 cm$^{-1}$ based on carbonyl group of vinyl acetate but the product after the hydrolysis had no such IR band, but had broad band near 3400 cm$^{-1}$, based on hydroxyl group.

After the hydrolysis, the crosslinked polyvinyl alcohol was neutralized and washed with water and filtered through a stainless steel screen of 400 mesh. The product obtained from the screen was centrifuged at 1500 rpm for 20 minutes and the product was weighed. The product was dried in a Geer's oven at 105° C. for 3 hours and the water content of the crosslinked polyvinyl alcohol was measured to give 1.80 water/g. dry resin.

The resulting gel was seived by a screen having 28 mesh and a screen having 42 mesh to separate the gel beads between 28–42 mesh. The gel particles dispersed in 15% NaCl aqueous solution were packed in a glass column having an inner diameter of 1.6 cm to give a bed volume of about 60 ml.

About 300 ml. of distilled water was passed through the column under maintaining the bed volume.

In the packed column substituted by water, 4 ml. of an aqueous solution containing 0.05 wt. % of polysaccharide, inulin (average molecular weight of about 5200) and 7.5 wt. % of NaCl was added and a column development was carried out by passing distilled water as an eluent at a rate of 180 ml./hr. Each 2 ml. of the eluate was sampled and inulin was analyzed by the phenol-sulfuric acid method measuring absorbance at 485μ and NaCl was analyzed by the silver nitrate titration using potassium chromate as an indicator. It was confirmed the NaCl was substantially separated from inulin. The resulting condition is shown in FIG. 1.

The crosslinked polyvinyl alcohol gel was insoluble in water methanol and the other organic solvents. This fact shows the formation of substantially complete crosslinkage.

The dried gel exhibited great strength and did not appear to be brittle when rubbed. The gel in the swollen condition also exhibited great strength and was not easily deformable.

EXAMPLES 2 AND 3

In accordance with the process of Example 1, each suspension polymerization was carried out by using 9.0 g. of triallyl isocyanurate as the crosslinking agent and 30 g. or 60 g. of ethyl acetate as the diluent to obtain each powdery crosslinked polyvinyl acetate and each hydrolysis was carried out and a water content of the resulting gel of the crosslinked polyvinyl alcohol was measured. The results are shown in Table 1.

TABLE 1

|  | Ethyl acetate (g) | Water content (g. water/g. dry polymer) |
| --- | --- | --- |
| Exp. 2 | 30 | 1.35 |
| Exp. 3 | 60 | 1.65 |

The crosslinked polyvinyl alcohol gels prepared by using 9 g. of the crosslinking agent to 90 g. of vinyl acetate, had high strength and its volume in a wet condition was substantially the same as that of a dry condition.

EXAMPLES 4, 5 AND 6

In accordance with the process of Example 1, each suspension polymerization was carried out by using the same crosslinking agent except adding 10 g., 30 g. or 60 g. of toluene as a diluent. The water contents of the resulting gels after the hydrolysis are shown in Table 2.

TABLE 2

|  | Crosslinking agent (g) | Toluene (g) | Water content (g. water/g. dry resin) |
| --- | --- | --- | --- |
| Exp. 4 | 4.5 | 10 | 2.01 |
| Exp. 5 | 4.5 | 30 | 2.57 |
| Exp. 6 | 4.5 | 60 | 3.20 |

EXAMPLE 7

In accordance with the process of Example 1 except using 4.5 g. of triallyl cyanurate as the crosslinking agent to 90 g. of vinyl acetate, the suspension polymerization was carried out and a water content of the resulting gel after the hydrolysis was measured. The water content was 1.74 g. water/g. dry resin. The crosslinked condition was substantially the same as the crosslinked condition resulting from triallyl isocyanurate. The strength of the gel was substantially the same as the product of Example 1.

In accordance with the process of Example 1, the separation of inulin from NaCl was carried out by using the resulting gel. The separation factor was substantially the same as that of Example 1 using triallyl isocyanurate for the crosslinkage and the substantially complete separation was attained.

EXAMPLE 8

In accordance with the process of Example 1, the suspension polymerization of vinyl acetate was carried out by using 4.5 g. of diallyl propargyl cyanurate as a crosslinking agent and the resulting crosslinked polyvinyl acetate was hydrolyzed to obtain a crosslinked polyvinyl alcohol gel and a water content of the gel was measured. The water content was 1.5 g. water/g. dry resin.

A preparation of diallyl propargyl cyanurate is described.

In a 500 ml. three necked round bottom flask equipped with a stirrer, 24 g. (0.6 mole) of sodium hydroxide was dissolved in a mixture of 63.3 g. (1.13 mole) of propargyl alcohol and 131.7 g. (2.27 mole) of allyl alcohol, at room temperature and then 36.9 g. (0.2 mole) of cyanuric chloride was added dropwise with thoroughly stirring the reaction mixture so as to maintaining the temperature of 25° to 30° C. for 1.5 hours. After the addition, the reaction was continued at 30° C. for 3.5 hours. After the reaction, the reaction mixture was filtered to separate insoluble materials such as sodium chloride. The filtrate was poured into a large amount of cold water to precipitate the product. The precipitate was dissolved into methanol and the solution was poured into cold water to precipitate the product. The product was recrystallized from isopropanol-water mixture. The resulting diallyl propargyl cyanurate was white crystal having a melting point of 35° C.

EXAMPLE 9

A suspension polymerization was carried out by using a system containing 35 g. of vinyl acetate, 40 g. of ethyl acetate as a diluent, 0.7 g. of polyethyleneoxide (Alcox E45 manufactured by Meisei Kagaku Kogyo K.K.) as a suspending agent and 250 g. of water, 1.84 g. of disodium phosphate, 0.1 g. of monosodium phosphate as additives and 0.05 g. of azobisisobutyronitrile as an initiator, and triallyl isocyanurate as the crosslinking agent at a content of (1) 0.35 g.; (2) 0.77 g. or (3) 2.8 g. at 60° C. for 17 hours.

The crosslinked polyvinyl acetate beads having a diameter of about 100$\mu$ were formed in each suspension polymerization. The products were completely hydrolyzed and water contents of the resulting crosslinked polyvinyl alcohol gels were measured in accordance with the process of Example 1. The results are as follows.

TABLE 3

| | water content (g. water/g. dry resin) |
|---|---|
| (1) 0.35 g. | 5.4 |
| (2) 0.77 g. | 3.6 |
| (3) 2.8 g. | 2.8 |

Each fractional zone of each crosslinked polyvinyl alcohol gel was measured by using standard polyethyleneglycol (known molecular weight) and water as an eluent by a differential refractometer.

The minimum molecular weights of excluded polyethyleneglycols are as follows.

TABLE 4

| | Minimum molecular weight of excluded polyethyleneglycol |
|---|---|
| (1) | 4,500 |
| (2) | 3,000 |
| (3) | 1,000 |

Figure 2:
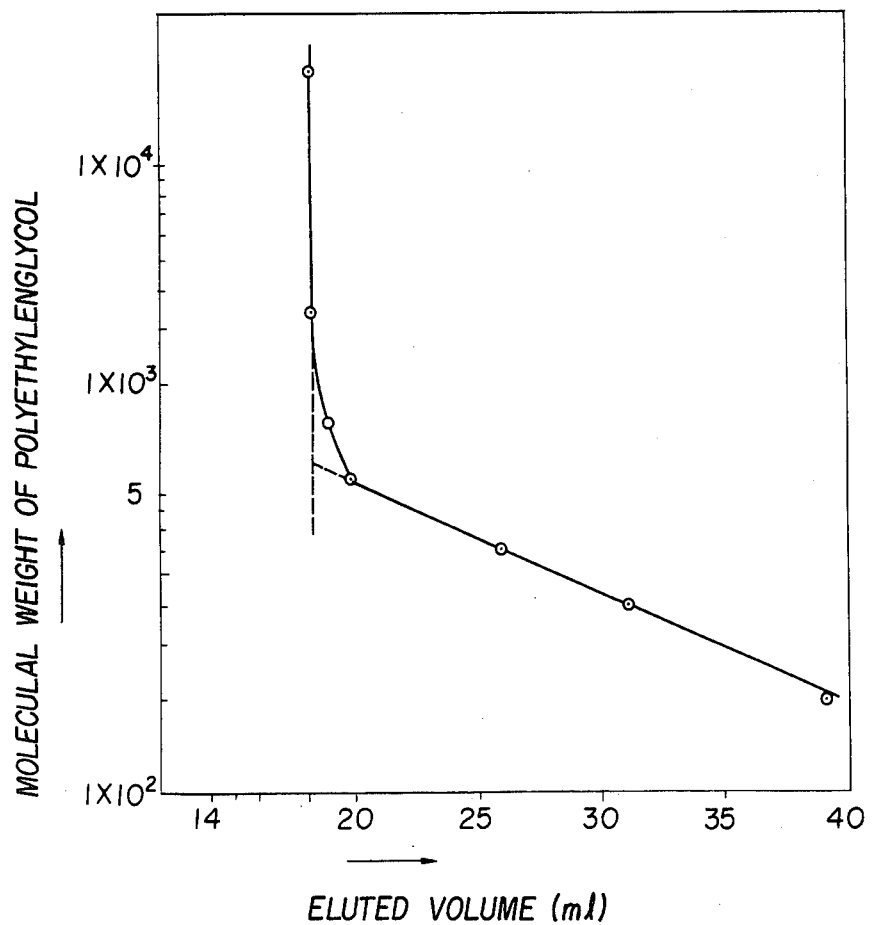
FIG. 2 is a graph showing a relation of molecular weights of polyethyleneglycols and eluted volumes by a gel chromatography using the gel obtained by the process of Example 9.
Figure 3:
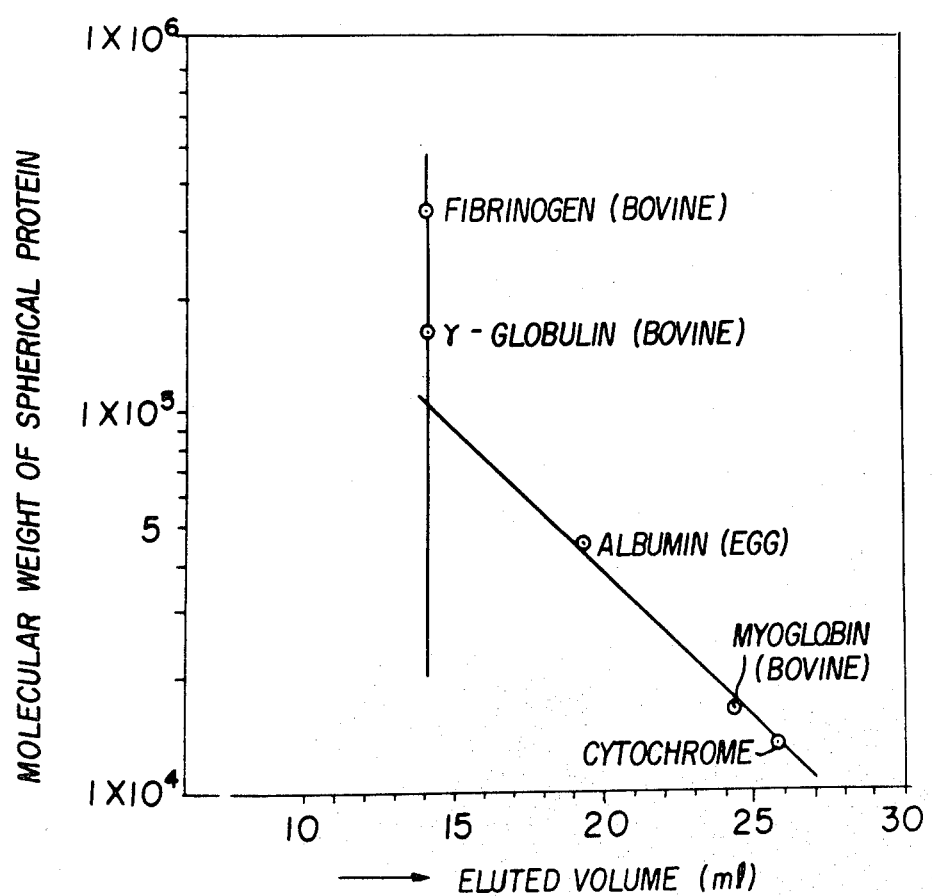
FIG. 3 is a graph showing the relationship of the molecular weight of spherical proteins and eluted volumes by gel chromatography using the gel obtained by the process of Example 10.

The elution curve of Example 9-(3) is shown in FIG. 2.

EXAMPLE 10

A suspension polymerization was carried out by using a system containing 2 g. of polyvinyl pyrrolidone (K-90) as a suspending agent, 200 g. of water, 30 g. of vinyl acetate, 10 g. of n-octane, 15 g. of n-heptyl alcohol, 4 g. of triallyl isocyanurate as a crosslinking agent 1.2 g. of disodium phosphate, 0.07 g. of monosodium phosphate and 0.8 g. of azobisisobutyronitrile as a polymerization initiator at 60° C. for 15 hours to obtain crosslinked polyvinyl acetate gel having uniform bead form (diameter of about 50$\mu$). The product was completely hydrolyzed and a water content of the resulting crosslinked polyvinyl alcohol gel was measured in accordance with the process of Example 1. The water content was 2.35 g. water/g. dry resin.

Each fractional separation of polyethyleneglycols, dextrans or spherical proteins by a column development was carried out by using the crosslinked polyvinyl alcohol gel. The results are as follows.

TABLE 5

| | Minimum molecular weight of excluded compounds |
|---|---|
| Polyethyleneglycols | 20,000 |
| Dextrans | 45,000 |
| Spherical proteins | 100,000 |

EXAMPLE 11

In accordance with the process of Example 10 except using 14.8 g. of n-octane and 22.1 g. of n-heptyl alcohol (the ratio is the same) and using 8 g. of triallyl isocyanurate as a crosslinking agent, the suspension polymerization and the hydrolysis were carried out to obtain a crosslinked polyvinyl alcohol bead gel having a diameter of about 70$\mu$ and a water content of 2.91 g. water/g. dry resin. The gel was hard and was not deformed nor broken by pushing. The gel was packed in a column having a diameter of 1.6 mm and the minimum molecular weight of excluded spherical proteins was measured by using the standard spherical proteins. The minimum molecular weight was about 500,000.

The fraction characteristics of the crosslinked polyvinyl alcohol gel can be controlled by selecting the amount and kind of the diluent.

EXAMPLE 12

A suspension polymerization was carried out by using a system containing 90 g. of vinyl acetate. 0.2 g. of polyethyleneoxide (Alcox E 160 manufactured by Meisei Kagaku Kogyo K.K.) 1.8 g. of triallyl isocyanurate (TAIC) as a crosslinking agent, 210 g. of water and $\alpha,\alpha'$-azo-diisobutyronitrile as a polymerization initiator at 60° C. for 16 hours to obtain a powdery crosslinked polyvinyl acetate having an average particle size of 100$\mu$. The product was filtered and washed with water and the resulting polymer was swollen in methanol and hydrolyzed in a mixture of water-sodium hydroxide-methanol by refluxing the mixture.

After the hydrolysis, the crosslinked polyvinyl alcohol was neutralized and washed with water and filtered through a stainless steel screen of 400 mesh. The product obtained from the screen was centrifuged at 1500 rpm for 20 minutes and the product was weighed. The product was dried in a Geer's oven at 105° C. for 3 hours and the water content of the crosslinked polyvinyl alcohol was measured to give 3.40 g. water/g. dry resin. The resulting gel was transparent and insoluble in water and organic solvents. This fact shows a desired crosslinkage.

In 200 g. of water, 50 g. of the gel was charged and 150 ml. of 5 N-NaOH aqueous solution and 100 g. of epichlorohydrin were added and the mixture was stirred at 53° C. for 16 hours and then at 80° C. for 5 hours. The product was repeatedly washed with water and with methanol. Thus, polyvinyl alcohol gel crosslinked by epichlorohydrin was obtained. The water content of the gel was 3.03 g. water/g. dry resin.

The shrinkages of the gels (before and after the crosslinking with epichlorohydrin) in 15 wt.% NaCl aqueous solution are shown in Table 6.

TABLE 6

| | Shrinkage in 15 wt. % NaCl aq. |
|---|---|
| PVA gel before crosslinking with epichlorohydrin | 38.3% |
| PVA gel crosslinked with epichlorohydrin | 17.0% |

The shrinkage in 15 wt.% NaCl aq. was calculated by the following equation.

$$S(\%) = \frac{W_o - \left(\frac{W}{\rho}\right)}{W_o} \times 100$$

wherein $W_o$ designates a water content of a gel in water; $\rho$ designates a specific gravity of 15 wt.% NaCl aq. (1.111) and W designates a water content of a gel in 15 wt.% NaCl aq. (NaCl+water)

In accordance with the measurement of $W_o$, W was measured except weighing a dry weight of a gel after washing with NaCl aq. and drying it.

As it is clearly understood by Table 6, the gel having lower shrinkage in NaCl aq. can be obtained by the post-crosslinking with epichlorohydrin.

The polyvinyl alcohol gel which was post-crosslinked with epichlorohydrin of the present invention was packed in a glass column having an inner diameter of 1.6 cm in a form of a dispersion in 15 wt.% NaCl aqueous solution. A separation of bovine serum albumin (average molecular weight of about 75,000) from NaCl was carried out by using the column. The solution of bovine serum albumin and NaCl was prepared by dissolving 4 g. of albumin in 15 wt.% NaCl aqueous solution and water was added to give 100 ml. of the total solution.

5 Ml. of the solution was added to the column and a column development was carried out by passing distilled water as an eluent at a rate of 150 ml./hour. NaCl was substantially separated from the albumin. The concentration of NaCl was analyzed by 0.1 N-silver nitrate titration using a potassium chromate as indicator. The bovine serum albumin was analyzed by using HABCA (Diguanotester A manufactured by Daiichi Kagaku Yakuhin Kabushiki Kaisha) and measuring absorbance at 480μ.

EXAMPLE 13

A suspension polymerization was carried out by using a system containing 90 g. of vinyl acetate, 9.0 g. of triallyl cyanurate, 60 g. of ethyl acetate as a diluent and benzoyl peroxide as a polymerization initiator to obtain a powdery crosslinked polyvinyl acetate.

In accordance with the process of Example 12, a hydrolysis of the product was carried out to obtain a crosslinked polyvinyl alcohol gel. The water content of the gel was 1.65 g. water/g. dry resin.

The gel had high strength and was not easily pulverized by a stirring etc.

A post-crosslinking treatment was carried out by treating 50 g. of the gel with a mixture of 200 g. of water, 150 ml. of 5 N-NaOH aqueous solution and 100 g. of epichlorohydrin at 53° C. for 16 hours and at 80° C. for 5 hours.

The shrinkages of the gels (before or after the post-crosslinking with epichlorohydrin) in 15 wt.% NaCl aqueous solution are shown in Table 7.

TABLE 7

| | Shrinkage in 15 wt. % NaCl aq. |
|---|---|
| PVA gel before crosslinking with epichlorohydrin | 23.0% |
| PVA gel crosslinked with epichlorohydrin | 13.2% |

EXAMPLE 14

A suspension polymerization was carried out by using a system containing 90 g. of vinyl acetate, 4.5 g. of diallyl propargyl cyanurate, and benzoyl peroxide as a polymerization initiator, and then, a hydrolysis of the product was carried out in accordance with the process of Example 12 to obtain a crosslinked polyvinyl alcohol gel. A post-crosslinking treatment of the gel with epichlorohydrin was carried out in accordance with the process of Example 12. The shrinkage of the gel in the 15 wt.% NaCl aqueous solution was 26.2% before the post-crosslinking treatment and 16% after crosslinking with epichlorohydrin.

EXAMPLE 15

In accordance with the process of Example 12, a suspension polymerization was carried out except using 0.1 g. of triallyl isocyanurate (TAIC) as a crosslinking agent to obtain a powdery crosslinked polyvinyl acetate.

The product was charged in a mixture of methanol and water (1:1 by weight) and the mixture was heated to 60° C. and 20% NaOH aqueous solution was added to give equal mole of NaOH to vinyl acetate and a hydrolysis was carried out to obtain a crosslinked polyvinyl alcohol gel. The gel was insoluble in water. The water content of the gel was 12.4 g. water/g. dry resin.

A shrinkage of the gel in 15 wt.% NaCl aqueous solution was higher than 50%.

10 grams of the gel (dry weight) was dipped in 5 N-NaOH aqueous solution and filtered by an aspirator and 10 g. of epichlorohydrin was added and the mixture was heated at 70° C. for 4 hours to carry out a post-crosslinking treatment. The operation was repeated for two times. The water content of the post-crosslinked polyvinyl alcohol gel was decreased to 2.1 g. water/g. dry resin. The shrinkage of the gel in 15 wt.% NaCl aqueous solution was 8.2%. The improvement of shrinkage resistance was found.

We claim:

1. A crosslinked non-ionic polyvinyl alcohol gel useful as a packing for gel chromatography which is obtained by a process, comprising: copolymerizing 100 parts by weight of a vinylacylate and 0.1 to 50 parts by weight of a crosslinking agent having the formula (I) or (II):

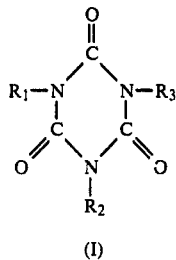
(I)

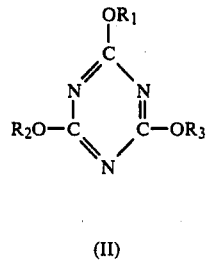
(II)

wherein $R_1$, $R_2$ and $R_3$ are the same or different and each is selected from the group consisting of $-CH_2-CH=CH_2$, $-CH_2-C\equiv CH$ and

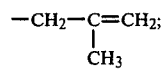

and hydrolyzing the product.

2. The crosslinked polyvinyl alcohol gel according to claim 1, wherein said vinyl acylate is a compound of the formula

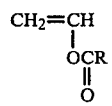

wherein R is a lower alkyl group.

3. The crosslinked polyvinylalcohol gel according to claim 1, wherein said ratio ranges from 0.5 to 30 parts by wt of said crosslinking agent per 100 parts by wt of said vinyl acylate.

4. The crosslinked polyvinyl alcohol gel according to claim 1 wherein the gel has a bead form having a particle diameter of $10\mu$ to $500\mu$.

5. The crosslinked polyvinyl alcohol gel according to claim 1 wherein the vinyl acylate component is vinyl acetate.

6. The crosslinked polyvinyl alcohol gel according to claim 1 wherein the pore size of the crosslinked polyvinyl alcohol gel is in the range of 100 to 5,000 Å and is controlled by incorporating a diluent in the polymerization system.

7. The crosslinked polyvinyl alcohol gel according to claim 1 wherein the gel is post-crosslinked by epichlorohydrin.

8. The crosslinked polyvinyl alcohol gel according to claim 1 wherein the gel has vinyl alcohol units crosslinked by the crosslinking units in a three dimensional net structure.

9. A crosslinked, non-ionic polyvinyl alcohol gel useful as a packing for gel chromatography obtained by a process, consisting essentially of: copolymerizing 100 parts by weight of a vinylacylate and 0.1 to 50 parts by weight of a crosslinking agent having the formula (I) or

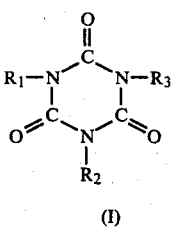
(I)

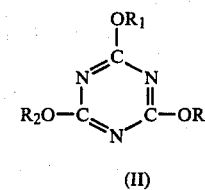
(II)

wherein $R_1$, $R_2$ and $R_3$ are the same or different and each is selected from the group consisting of $-CH_2-CH=CH_2$, $-CH_2-C\equiv CH$ and

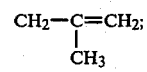

and hydrolyzing the product.

* * * * *